E. L. PERRY & W. A. TORREY.
HOSE.
No. 66,518.                    Patented July 9, 1867.
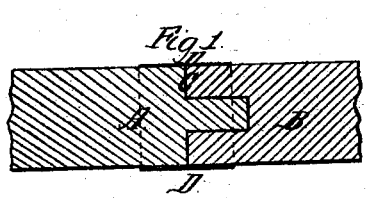
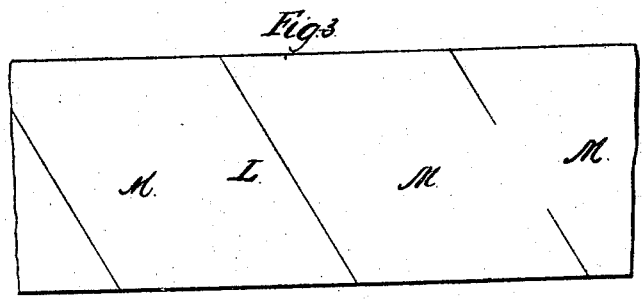
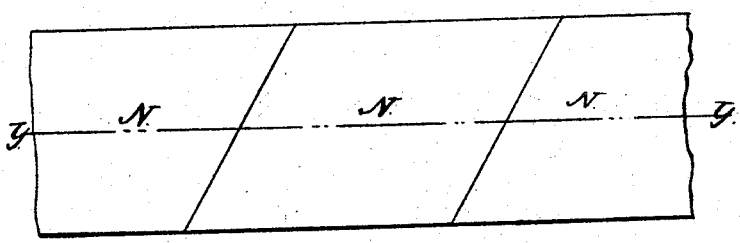
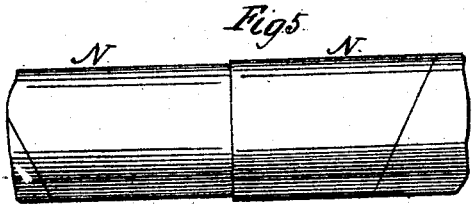

United States Patent Office.

EDWARD L. PERRY, OF NEW YORK, N. Y., AND WILLIAM A. TORREY, OF MONTCLAIR, NEW JERSEY.

*Letters Patent No. 66,518, dated July 9, 1867.*

---

IMPROVEMENT IN THE MANUFACTURE OF RUBBER HOSE.

---

*The Schedule referred to in these Letters Patent and making part of the same.*

---

TO ALL WHOM IT MAY CONCERN:

Be it known that we, EDWARD L. PERRY, of the city, county, and State of New York, and WILLIAM A. TORREY, of Montclair, Essex county, and State of New Jersey, have invented new and useful Improvements in the Manufacture of Hose; and we do hereby declare that the following is a full, clear, and exact description thereof, which will enable others skilled in the art to make and use the same, reference being had to the accompanying drawings, forming part of this specification.

The present invention consists—

First. In covering the joint or joints of the several sections of the mandrel on which the hose is formed with a layer or layers of sheet paper, or such other material that when the hose is completed it can be removed without injury thereto; the object of covering these joints as above described being to prevent the rubber from running into the same, and thus, as the hose is vulcanized, forming ridges or ribs around its interior.

Second. Interposing between the inside tube or lining of the hose and the outside covering of the hose a layer or layers of air-proof stock or material, either of rubber, metal, or any other air-proof material, whereby the particles of water under pressure are prevented from coming in contact with the rubber vulcanized on cloth, which, creating a weak solution of sulphuric acid, decomposes the fibres of the cloth, and in a short time renders it weak and worthless, and the hose is also prevented from sweating when under pressure, thereby insuring a perfectly dry hose externally.

Third. In so winding the cotton-duck, or other fibrous material with which the hose is covered, in separate strips, that the warp-threads of the one strip will run across or intersect the warp-threads of the other, whereby they are made to support and strengthen each other, and thus to impart a corresponding degree of strength to the hose.

In the accompanying plate of drawings our improvements in the manufacture of hose are illustrated—

Figure 1 being a section through one of the joints of the mandrel.

Figure 2, a cross-section of my improved hose.

Figure 3, a plan view of a strip of cloth cut on a bias; and

Figure 4, a view of the same prepared for winding.

Figure 5, a view of the cloth, showing how its warp-threads cross or intersect each other.

A and B, in the drawings, represent the two sections of a mandrel joined together at C, where a strip, D, of paper, or other suitable material, is wound for the purpose of preventing the rubber of which the interior lining to the hose is made from entering such joint, and thus causing a ridge or rib to be formed around its interior periphery. E, our improved hose, of which F is the inner lining, made of India rubber or gutta percha, or of any of its elastic compounds, and the outer covering thereto composed of a fibrous or textile fabric, that, when wound, as will be hereinafter described, is covered upon its outside with India rubber or gutta percha. Between the inner tube F and outer fabric G is a lining or layer of air and water-proof fabrics, H, by which the sweating of the hose is prevented. In fig. 3 a strip of cloth, L, is shown, that across its width is cut into bias sections or pieces, M, that are then secured together at their ends, forming a strip, N, the warp-threads of which run as indicated by the red lines in fig. 4. This strip is to constitute the outer covering to the hose, and before being wound is cut, along the line $y\ y$, into two parts or sections that, when wound upon the mandrel over the inside tubes, are wound in opposite directions, bringing the warp-threads across or in lines intersecting each other, as shown in fig. 5, and for a purpose hereinbefore stated.

Having thus described our invention, what we claim as new, and desire to secure by Letters Patent, is—

1. In the manufacture of India-rubber or gutta-percha hose, covering the joint or joints of the mandrel in which the hose is made with a strip or strips of paper, substantially as and for the purpose described.

2. In interposing between the inner tube or lining to India rubber or gutta percha, and the outer covering, of whatever material made, a layer or layers of any suitable air and water-proof stock or material, substantially as and for the purpose specified.

3. In the manufacture of India-rubber or gutta-percha hose, so winding the cotton-duck, or other fibrous or textile fabric used, that the warp-threads of the fabric will intersect or cross each other, substantially as and for the purpose specified.

EDWARD L. PERRY,
WILLIAM A. TORREY.

Witnesses:
ALBERT W. BROWN,
J. A. SERVICE.